United States Patent [19]

Bohme et al.

[11] 4,434,365

[45] Feb. 28, 1984

[54] RADIOMETRIC METHODS AND MEANS

[75] Inventors: Rolf C. Bohme, Kyalami; Max M. Lazerson, Northcliff, both of South Africa

[73] Assignee: General Mining Union Corporation Limited, Johannesburg, South Africa

[21] Appl. No.: 211,098

[22] Filed: Nov. 28, 1980

[30] Foreign Application Priority Data

Dec. 21, 1979 [ZA] South Africa ............... 79/6989
Jul. 15, 1980 [ZA] South Africa ............... 80/4251

[51] Int. Cl.³ ............... G01V 5/00; G01N 23/00; G21C 11/00
[52] U.S. Cl. ............... 250/255; 250/359.1; 250/515.1
[58] Field of Search ............... 250/255, 328, 358 R, 250/359, 360, 361 R, 505, 506, 515, 507.1, 363 R

[56] References Cited

U.S. PATENT DOCUMENTS

| | | | |
|---|---|---|---|
| 3,996,471 | 12/1976 | Fletcher et al. | 250/363 R |
| 4,029,961 | 6/1977 | Lohr et al. | 250/328 |
| 4,081,689 | 3/1978 | Reiss | 250/515.1 |
| 4,224,517 | 9/1980 | Lubecki et al. | 250/255 |
| 4,275,298 | 6/1981 | Wykes et al. | 250/255 |
| 4,293,767 | 10/1981 | Fischer et al. | 250/359.1 |
| 4,300,043 | 11/1981 | Robbins | 250/363 R |

Primary Examiner—Janice A. Howell
Attorney, Agent, or Firm—Finnegan, Henderson, Farabow, Garrett & Dunner

[57] ABSTRACT

A method of and apparatus for measuring radio-active emissions from moving radio-active material.

Use is made of a radiation detector, a first radiation shield of a first material which shields the detector, and a second radiation shield which is located between at least a portion of the first shield and the detector.

The material of the second shield is inherently less contaminated and emits secondary excitation radiation of lower energy than the first material.

15 Claims, 11 Drawing Figures

FIG_4

FIG_6

FIG_5

FIG_8

FIG_7

FIG_9

FIG_10

FIG_11

RADIOMETRIC METHODS AND MEANS

FIELD OF THE INVENTION

This invention relates to a method of and apparatus for measuring the radio-active emissions from moving radiation emissive material and particularly radio-active particles of ore.

BACKGROUND TO THE INVENTION

In the sorting of radiation emissive ores such as uranium ore or gold ore which contains traces of uranium the ore particles are fed in bulk or discretely in a stream generally on a moving conveyor past one or more radiation detectors which measure the radiation of the particles. The radiation measurement of the individual particles or zones of particles is then compared with a physical characteristic parameter such as mass or volume to differentiate between particles or zones of particles which are above or below a predetermined grade. The particles are then discharged from the conveyor past or into an arrangement for sorting the particles into accept or reject fractions in dependence on their measured grade.

A problem with ore sorting arrangements of the above type is that the radio-active radiation of the particles is difficult to measure accurately while the particles are moving at speed past the or each detector and this is particularly so when dealing with ores such as gold ores which have weak emissions. This problem leads to sorting inefficiencies and has the following principal causes:

(a) The radio-active emissions from the particles are random in the case of a sorter which employs only one radiation detector, may even be missed. This difficulty is, however, reduced somewhat in more modern sorting equipment by the provision of a plurality of radiation detectors which are arranged in series adjacent and along the path of the particles and connected to a computer for averaging the radio-active count from each particle or zone of radio-active particles statistically to reduce counting errors which may arise as a result of random emissions from the particles. (b) Due to the weak nature of the emissions from small quantities of radioactive material in particles such as is found in South African gold ores the measurable emissions which are picked up by the remote radiation counters may be swamped by or close to the level of background radiation in the measuring zone even though the measuring zone of the sorter is heavily lead shielded. The background radiation has in practice been found to emanate principally from radio-active contamination of the lead shielding and natural cosmic radiation which varies from place to place on the earth's surface as well as natural radioactive trace elements such as potassium 40 which can be present in various geological and building materials.

(c) Radio-active interference from particles adjacent the specific particle or zone of particles being measured.

OBJECT OF THE INVENTION

It is the object of this invention to provide a method of and apparatus for measuring radio-active emissions from moving material which will minimise the problems mentioned above.

SUMMARY OF THE INVENTION

A method of measuring radio-active emissions from moving radio-active material according to the invention consists in locating a radiation detector adjacent the path of the material, shielding the detector adjacent its receptor surfaces by means of a first radiation shield of a first material, further shielding the shielded portion of the detector by locating a second radiation shield of a second material which is inherently less radiation emissive than the material of the first shield between at least a portion of the material of the first shield and the detector, moving the material to be measured for radio-active emissions past the unshielded receptor surface of the detector and measuring the emissions from the material by means connected to the detector. Preferably, the method includes the step of shielding at least the portion of the material path opposite to the side on which the detector is located by means of a radiation shield.

A method of measuring radio-active emissions for moving radio-active material according to the invention includes the steps of locating a radiation detector in a housing adapted to shield the detector adjacent its receptor surface from extraneous radiation, locating a cover of radiation shield material which includes a collimating aperture over the receptor surface of the detector, passing the radio-active material along a path over the cover aperture and measuring the radio-active emissions from the material which impinges on the receptor surface of the detector. Preferably, the shield material from which the detector cover is made is inherently less radio-active than the material from which the housing is made.

Apparatus for measuring radio-active emissions from moving radio-active material according to the invention includes a radiation detector, a first radiation shield of a first material which is located relatively to the detector to shield the detector adjacent its receptor surface, a second radiation shield made from a second material which is inherently less contaminated and/or emits secondary excitation radiation of lower energy than the material of the first shield located between at least a portion of the material of the first shield and the detector and means attached to the detector for converting radio-active emissions which impinge on the receptor surface of the detector into electrical signals which may be counted.

In one form of the invention the detector is a crystal scintillation counter and the first radiation shield is a housing of industrial lead and the second shield a sleeve of radioactively cleaner lead which is interposed between the first shield and the detector.

In a preferred form of the invention the detector is separated from the first shield by a third radiation shield which is made from a metal having a lower atomic number than that of lead. The third shield may be made from metals such as cadmium, copper and the like, or a combination of these or their alloys.

Further according to the invention the receptor surface of the detector could be covered by a radiation shield which is made from a metal such as platinum, tungsten alloys or the like, such have a greater specific gravity than that of lead, and includes a collimating aperture to limit the angle of vision of the receptor surface of the detector in at least two opposite directions.

Apparatus for measuring radio-active emissions from radio-active material according to the invention includes a radiation detector, a first radiation shield for shielding the detector from radiation other than on its receptor surface, and a cover made from radiation shielding material which includes a collimetric aperture located over the receptor surface of the detector. Preferably, the material from which the cover is made has a higher density than that of lead.

Apparatus for measuring radio-active emissions from radio-active material according to the invention includes a housing made from material for shielding radiation, a radiation detector located in the housing with at least a portion of its receptor surface unshielded through an aperture in the housing and a groove in the material of the housing which extends across the aperture in the housing in a direction transverse to the direction of movement of material over the detector so that radiation from the radio-active material which passes over the groove remote from the receptor surface of the detector may be measured by the detector, and means attached to the detector for measuring radiation counts from material exposed to the detector through the aperture and slot.

According to the invention a shield for attenuating radio-active radiation includes a laminate of lead and one or more metals which have a lower atomic number than lead.

BRIEF DESCRIPTION OF THE DRAWINGS

The invention is now described by way of example with reference to the drawings in which.

DETAILED DESCRIPTION OF THE INVENTION

Figure 1:
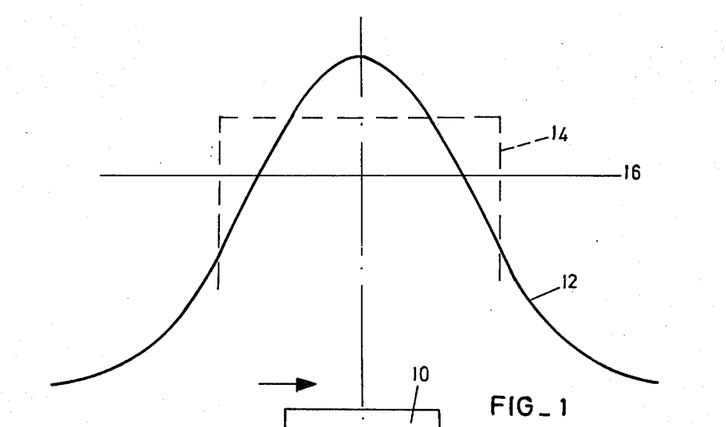
FIGS. 1 to 3 are graphic illustrations of the effect of the variation of counting distance from a radiation detector.
Figure 2:
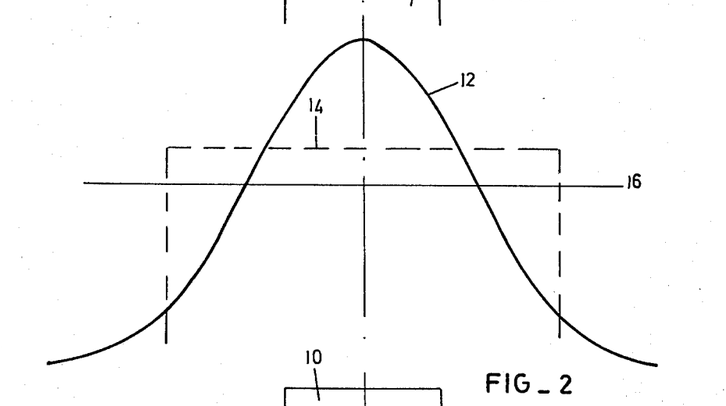
Figure 3:
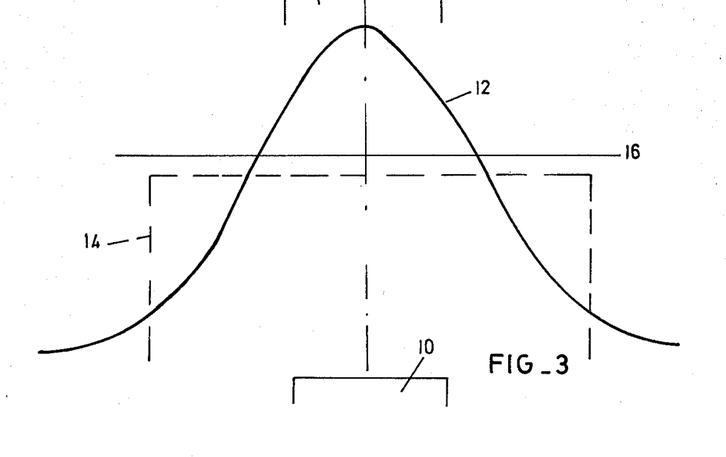

One of the problems of accurately measuring the radiation emitted from a moving radio-active particle, either singly or in bulk, is illustrated in FIGS. 1 to 3 which illustrate a scintillation detector 10, a solid line graph 12 which illustrates the radiation counting efficiency of the detector as the particle is moved from left to right in the drawings over the detector and a dotted line 14, the vertical portions of which indicate the horizontal distance over which the detector sees or is able to count the emissions from the particle and the horizontal portion which indicates, relatively to the curve 12, the average counts or radiation measurement over the counting distance. The solid horizontal line 16 in the drawings indicates, again relatively to the amplitude of the curve 12, the average level of background radiation noise in the counting zone.

As illustrated in FIG. 1 the counting distance between the vertical portions of the line 14 is only slightly larger than the width of the receptor surface of the detector 10. As an example, the detector could have a diameter of 75 mm and the counting distance in this drawing could be 100 mm. Assuming the peak of the counting curve in this example to be 100%, then it is not unusual in practice to have a background count of about 63% in these circumstances and an average count of about 84% over counting distances of the dimension illustrated. As will be appreciated from the drawing the average number of radiation counts over the counting distance provides an easily distinguishable differentiation between the background 16 and the average count of the particle or zone of particles being measured. However, as is apparent from FIGS. 2 and 3, as the counting distance increases so the average measured radiation counts over the counting distance decreases until, as in FIG. 3, the measured counts are totally swamped by the background radiation. Because of the random and sporadic nature of both the background and measured radiation it is extremely difficult, if possible at all, even with known electronic correlation techniques, to isolate the measured counts from the background as the average measured count approaches and merges with the background. From the above it is apparent that the measured count becomes far more accurate as the measuring distance, both horizontally and vertically, approaches the centre of the receptor surface of the detector.

Figure 4:
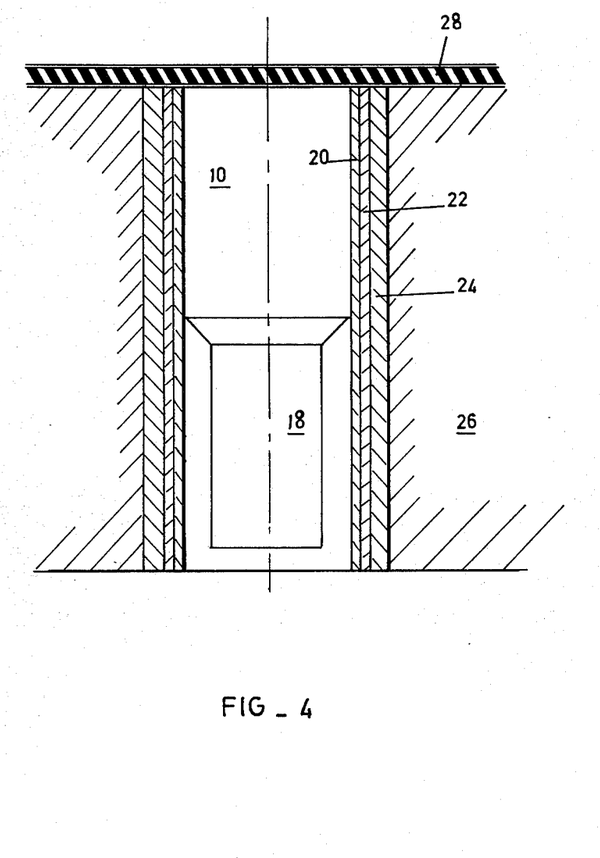
FIG. 4 is a sectional side elevation of a detector encased in various types of radio-active shielding.

FIG. 4 shows a scintillation crystal detector 10 including a photomultiplier 18, three sleeves 20, 22 and 24 of radio-active shielding material, a housing 26 in which the detector and its shields are located and a conveyor belt 28 which is suitably located for movement as close as is practically possible to the receptor surface of the detector 10.

The housing 26, as is common practice, is made from commercially available lead. In prior art radiation measuring devices, the housing lead abuts the detector crystal and is the only insulation which shields the non-operative surfaces of the crystal from background radiation and the radiation from particles other than that being specifically measured on the belt. The difficulty with this shielding arrangement is that most commercial lead is itself contaminated with radio-active emissive material. The inherent radio-activity of the lead will, of course, vary from place to place on the earth's surface in correspondence with cosmic radiation and it has been found in practice in Johannesburg, South Africa, that the inherent radiation of commercial lead registers as many as nine counts per second. Statistically, this means that in a total counting period of 250 milliseconds for a particle, 92% of the background counts will be less than 4 counts for an average of 9 counts per second and less than 2 counts for 4 counts per second. Substantially more expensive low contamination lead at the same place reads 4 counts per second, or less.

The shield sleeve 24 in FIG. 4 is made from low contamination lead, the shield 22 from low contamination cadmium and the shield 20 from low contamination copper. With this shielding arrangement the radio-active count from the sleeving arrangement reads as low as three counts per second. It will, therefore, be appreciated that with a shielding arrangement such as that described above the noise level 16 in FIGS. 1 to 3 will drop by two thirds of its vertical height relatively to the amplitude of the graph 12 so substantially enhancing the discrimination capability of the radiation measuring system which employs the detector 10.

Figure 5:
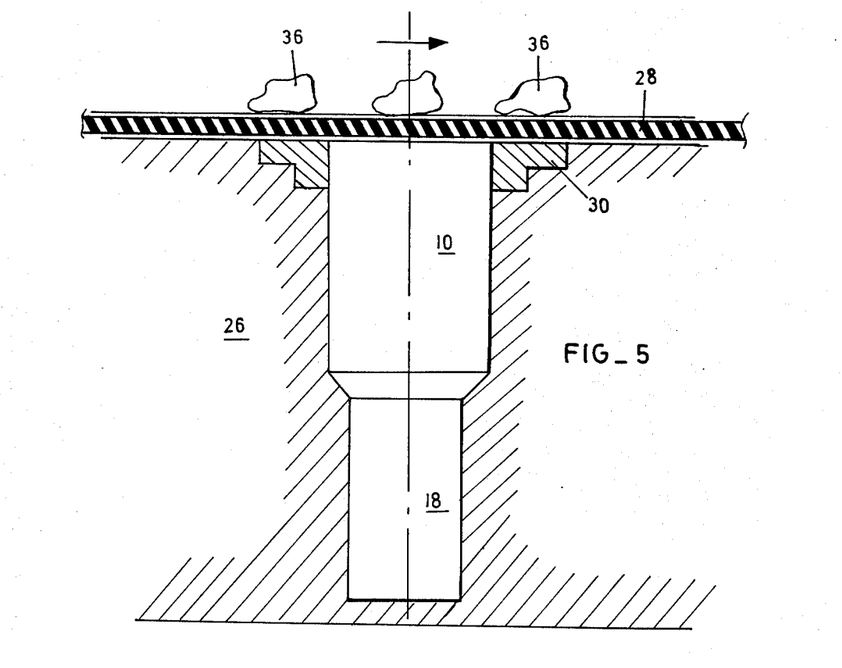
FIGS. 5 and 6 illustrate the effect of a second form of shielding on a radiation detector.

FIG. 5 is a similar view to that of FIG. 4. In this drawing the receptor surface of the detector 10 is surrounded by a metal insert 30 which is made from heavy metal, i.e. metal with a specific gravity higher than that of lead, such as platinum with a specific gravity of twenty-one and tungsten alloys with a specific gravity as high as eighteen.

Figure 6:
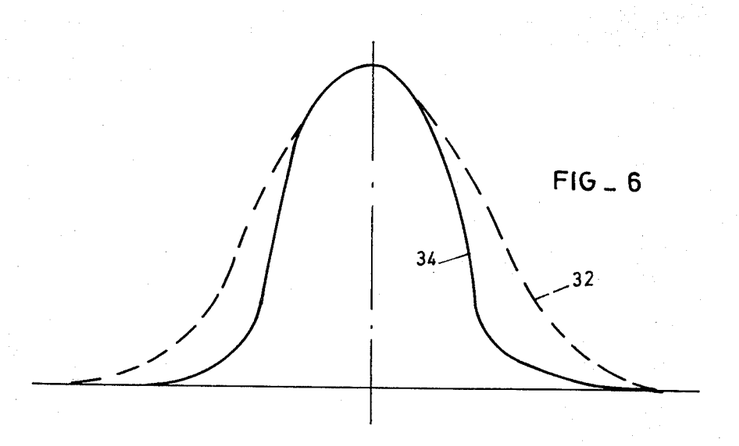

The graph of FIG. 6 is similar to that of FIGS. 1 to 3. The dotted curve 32 illustrates the counting pattern of the detector 10 in FIG. 5 as a radio-active particle is moved by the conveyor 28 over the detector 10 when it is shielded by the commercial lead only of the housing 26. The solid line graph 34 illustrates the effect that the shielding of the insert has on the counting pattern on the detector.

As is seen from FIG. 6 the sides of the curve 34 are cut off far more sharply nearer the sides of the detector than those of the dotted curve so narrowing the measuring distance of the shielded detector. The effect of this is that radiation from the outer ore particles 36 in FIG. 5 is substantially less likely to be seen by the detector when shielded by the insert 30 than is the case where the particles are situated in the measuring distance of the dotted line curve. The radiation shielding provided by the insert 30 therefore enables the detector to register a more positive radiation measurement of each particle by minimising radiation interference from the preceding and following particles in the stream on the conveyor 28.

Figure 7:
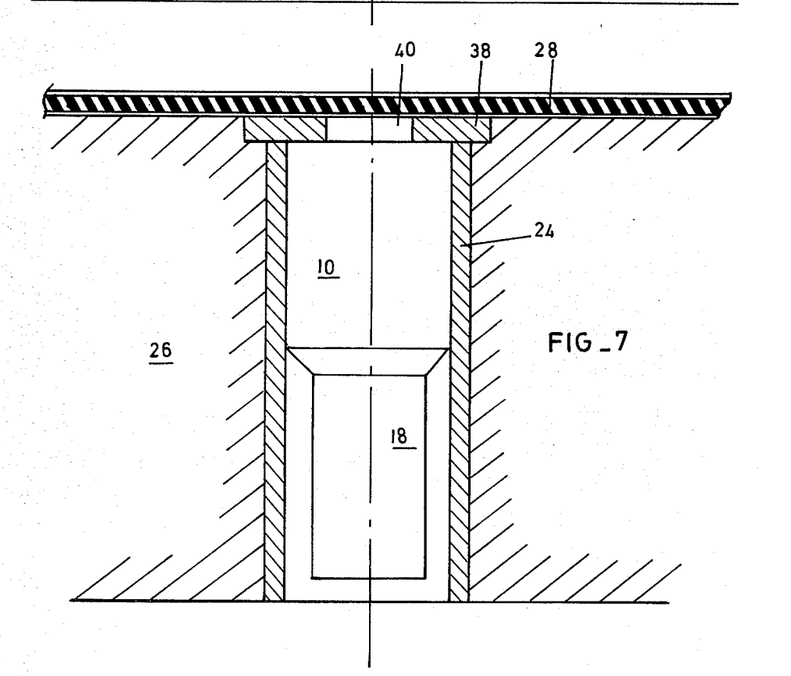
FIGS. 7 and 8 illustrate a variation of the FIG. 5 detector arrangement.
Figure 8:
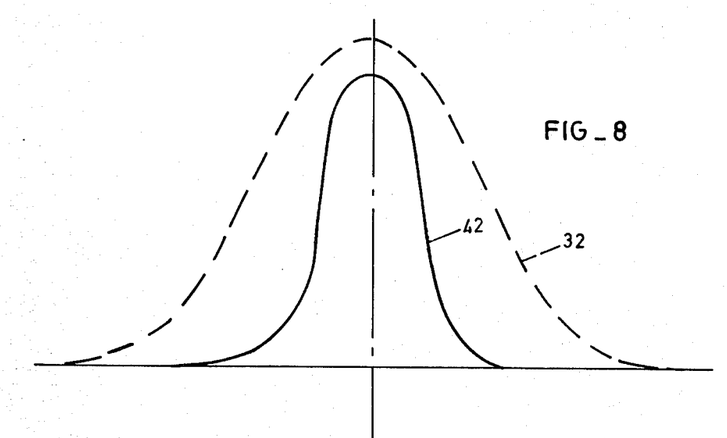

The above effect is further enhanced, as is seen in FIGS. 7 and 8, by covering the receptor surface of the detector with a heavy metal insert 38 which includes a collimating slot 40. The collimetric effect of the slot 40 reduces the measuring distance of the detector 10 yet further as illustrated by the solid line graph 42 in FIG. 8.

In a single file particle ore sorting machine the particles are ideally fed along the conveyor 28 in a straight line stream over the centres of a plurality of detectors 10 which each measure the radiation from each particle. The radiation measurements from each particle are then integrated, for example by a computer, and an average radiation measurement is then calculated for each particle in the stream. In practice due to the requirements of a commercially acceptable high throughput tonnage and the limitations of the particle feeding system, together with the fact that the machine must handle particles having a size range of possibly 2:1 or 3:1, many particles, and particularly smaller ones, are laterally displaced from the centre line of the conveyor belt and so the detectors. Due to the inverse square law of attenuation of radiation emission, and also particle detector geometry, the displaced particles register a considerably reduced radiation count compared to what the count of the particle would be if it had been on line over the detectors. This problem is complicated by the detector shielding and would be particularly severe if the heavy metal inserts of FIGS. 5 and 7 had to surround the receptor surfaces of the detectors completely. To minimise this problem one aspect of this invention provides grooves in the surface of the material of the housing 26 which extend across the receptor surface of the detectors in a direction normal to the direction of travel of the particles over the detectors.

Figure 9:
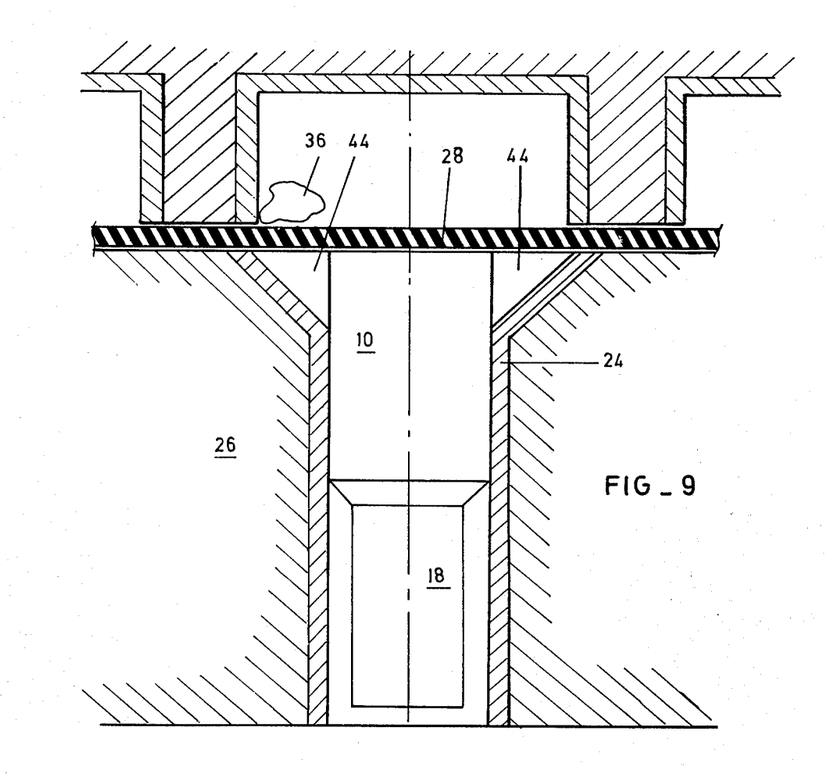
FIG. 9 illustrates yet another variation of the radiation shield of the invention.

This arrangement is illustrated in FIG. 9. In this arrangement the groove is as wide as the detector crystal and is in the form of two transverse chamfers 44. As will be appreciated from the drawing there will be little or no absorption attenuation of the radiation between the displaced one particle 36 and the detector 10 as the particle crosses the chamfered groove 44 to the left of detector. This has the effect of spreading the counting distance of the detector 10 in a direction transverse to the direction of ore travel while holding the distance narrow in the direction of travel.

Figure 10:
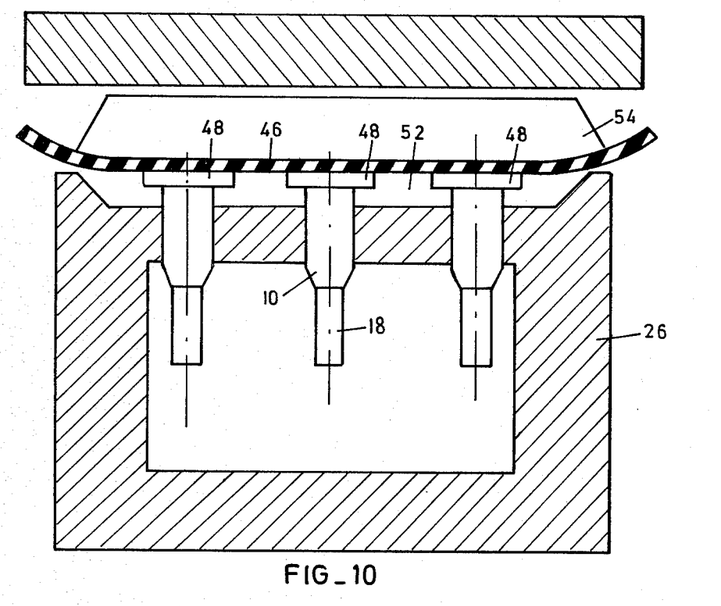
FIGS. 10 and 11 are respectively sectioned side and plan views of shielded detector arrangements in a radiation measuring station of an ore sorting machine.
Figure 11:
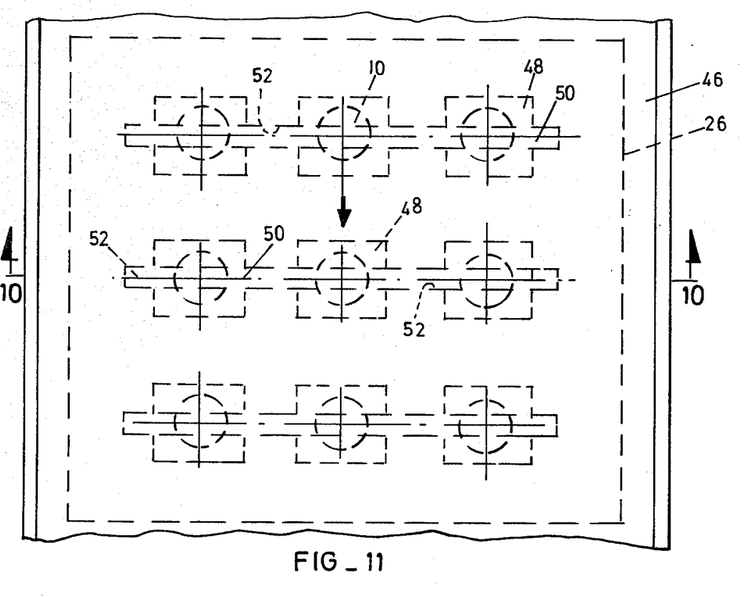

A practical example of the grooving and insert shielding of the invention is illustrated in FIGS. 10 and 11. Although these drawings are of a bulk sorter the techniques apply equally well to a particle sorter having a single row of detectors which are serially arranged in the direction of ore travel as opposed to the three rows illustrated in the drawing.

The drawings illustrate a lead detector housing 26 which carries nine detectors 10 which are arranged in three rows both in the direction of and transverse to the direction of ore travel on a conveyor belt 46. The direction of ore travel in the drawings is indicated by the arrow in FIG. 10. The receptor surface of each detector is shielded by a heavy metal insert 48 each of which consists of two rectangular blocks of the heavy metal which is set into the material of the housing on either side of the transverse centre line of the detctors. The blocks are spaced apart to define collimetric slots 50 which extend transversely across each detector. The lead of the housing 26 carries grooves 52 which are in register with the aligned slots 50 of each transverse row of detectors 10.

As mentioned above the effect of the grooves 52 is to broaden the measuring distance of the detectors 10 in a direction transverse to the direction of ore travel over the housing 26 while holding the distance as narrow as is practical to minimise the radiation effect of following and preceding particles in the direction of ore travel. As will be appreciated from FIG. 9 the measuring distance of any of the detectors in any of the transverse rows will transversely overlap each other effectively to cover the width of the conveyor belt 46 and measure in narrow transverse bands the radiation of particles in bulk material 54 which is conveyed on the conveyor 46 over the detectors 10. As mentioned above each band of material so measured for radio-activity is electronically tracked and the sequential measurements for each band are integrated to arrive at an average radiation measurement for each band for sorting purposes in a known manner.

The invention is not limited to the precise details as herein described. For example, each detector in the various embodiments could be and preferably is shielded by a multiple shield as described with reference to FIG. 4 or the like. Additionally, the particle paths over the detectors are located in all embodiments in shielded channels or covers as illustrated in FIG. 9 with the internal walls of the channels being shielded in the same manner as the detector described with reference to FIG. 4.

We claim:

1. A method of measuring radio-active emissions from moving radio-active material including the steps of locating a radiation detector having a receptor surface adjacent to the path of the material, shielding the detector by locating a first radiation shield of a first material around at least a portion of the detector leaving the receptor surface of the detector unshielded, further shielding the shielded portion of the detector by locating a second radiation shield of a second material which is inherently less radiation emissive than the material of the first shield between at least a portion of the material of the first shield and the detector, the first and second shields being effective as radiation shields against the same type of radiation, moving the material to be measured for radio-active emissions past the unshielded receptor surface of the detector and measuring the emissions from the material by means connected to the detector.

2. Apparatus for measuring radio-active emissions from moving radio-active material including a radiation detector having a receptor surface, a first radiation shield of a first material shielding at least a portion of the detector while leaving the receptor surface unshielded, and a second radiation shield made from a second material which is inherently less contaminated and emits secondary excitation radiation of lower energy than the material of the first shield located between at least a portion of the material of the first shield and the detector, the first and second shields being effective as radiation shields against the same type of radiation.

3. Apparatus as claimed in claim 2 in which the detector is a crystal scintillation counter, the first radiation shield is a housing of industrial lead and the second shield is a sleeve of lead which is interposed between the first shield and the detector, the lead of the second shield having a lower level of radio-active emission than the lead of the first shield.

4. Apparatus as claimed in claim 2 in which the detector is separated from the second shield by a third radiation shield which is made from a metal having a lower atomic number than that of lead.

5. Apparatus as claimed in claim 4 in which the third shield is made from metals such as cadmium and copper.

6. Apparatus as claimed in claim 2 in which the receptor surface of the detector is covered by a radiation shield which is made from a metal which has a greater specific gravity than that of lead and includes a collimating aperture to limit the angle of vision of the receptor surface of the detector in at least two opposite directions.

7. Apparatus as claimed in claim 6 in which the metal from which the cover is made is a metal such a platinum or a tungsten alloy.

8. Apparatus for measuring radio-active emissions from moving radio-active material including a housing made from material for shielding radiation, a radiation detector having a receptor surface located in the housing with at least a portion of its receptor surface unshielded through an aperture in the housing, and a groove in the material of the housing which extends across the aperture in the housing in a direction transverse to the direction of movement of material over the detector, so that radiation from the radio-active material which passes over the groove remote from the receptor surface of the detector is detected by the detector.

9. Apparatus as claimed in claim 8, including a plurality of detectors arranged in rows spaced from each other in the direction of movement of the radio-active material, said housing having a plurality of said grooves formed therein.

10. Apparatus as claimed in claim 9, said detectors also being arranged in rows transverse to the direction of movement of the radio-active material, each transverse row of detectors being in register with one of said grooves.

11. Apparatus as claimed in claim 9, including a conveyor belt above said housing for conveying the radio-active material.

12. Apparatus as claimed in claim 8, including a radiation shield which is constructed of a material which is inherently less contaminated and which emits secondary excitation radiation of lower energy than the material of the housing, said radiation shield being located between at least a portion of the detector and the housing.

13. Apparatus as claimed in claim 12, including a plurality of detectors arranged in rows spaced from each other in the direction of movement of the radio-active material, said housing having a plurality of said grooves formed therein.

14. Apparatus as claimed in claim 13, said detectors also being arranged in rows transverse to the direction of movement of the radio-active material, each transverse row of detectors being in register with one of said grooves.

15. Apparatus as claimed in claim 13, including a conveyor belt above the housing for conveying said radio-active material.

* * * * *